US00RE37655E

(19) United States
(12) Reissued Patent
Supplee

(10) Patent Number: US RE37,655 E
(45) Date of Reissued Patent: Apr. 16, 2002

(54) ADDITIVE FOR, METHOD OF ADDING THEREOF AND RESULTING CURED CEMENT-TYPE CONCREATIONS FOR IMPROVED HEAT AND FREEZE-THAW DURABILITY

(76) Inventor: William W. Supplee, 360 State Rte. 31 South, Suite 100, Washington, NJ (US) 07882

(21) Appl. No.: 09/642,736

(22) Filed: Aug. 19, 2000

Related U.S. Patent Documents

Reissue of:
(64) Patent No.: 5,922,124
Issued: Jul. 13, 1999
Appl. No.: 08/928,730
Filed: Sep. 12, 1997

(51) Int. Cl.[7] ..... C04B 24/00; C04B 26/14; C04B 26/16

(52) U.S. Cl. ..... 106/802; 106/728; 106/810; 106/823; 106/822; 106/273.1; 106/275; 106/281.1; 106/661; 106/724; 106/665; 106/668; 106/666; 106/659; 524/2; 524/3; 524/4; 524/5; 524/7; 524/8; 524/59; 524/66; 524/503; 524/524; 524/559; 524/6; 524/650; 428/537.5; 428/491

(58) Field of Search ..... 106/802, 724, 106/728, 810, 819, 823, 822, 273.1, 275, 281.1, 661, 660, 666, 665, 659, 668, 2; 524/2, 3, 4, 5, 7, 8, 59, 66, 503, 524, 559, 6, 650; 428/537.5, 491

(56) References Cited

U.S. PATENT DOCUMENTS

| | | | | | |
|---|---|---|---|---|---|
| 3,645,763 | A | | 2/1972 | Ronzio et al. | 106/819 |
| 3,895,953 | A | | 7/1975 | Mehta | 106/819 |
| 4,157,998 | A | | 6/1979 | Berntsson et al. | 106/819 |
| 4,199,363 | A | | 4/1980 | Chen | 430/512 |
| 4,230,502 | A | * | 10/1980 | Lustig et al. | 106/802 |
| 4,268,316 | A | | 5/1981 | Wills, Jr. | 106/705 |
| 4,434,193 | A | | 2/1984 | Bechenhauer | 106/2 |
| 4,878,948 | A | * | 11/1989 | Shah | 106/666 |
| 4,983,220 | A | | 1/1991 | Mathieu | 107/703 |
| 4,999,218 | A | | 3/1991 | Rehmer et al. | 524/359 |
| 5,240,995 | A | | 8/1993 | Gyory et al. | 524/54 |
| 5,294,256 | A | * | 3/1994 | Weigand et al. | 106/819 |
| 5,460,648 | A | | 10/1995 | Walloch et al. | 106/823 |
| 5,494,741 | A | | 2/1996 | Fekete et al. | 428/331 |
| 5,531,824 | A | | 7/1996 | Burkes et al. | 106/737 |
| 5,580,378 | A | | 12/1996 | Shulman | 106/677 |
| 5,595,594 | A | | 1/1997 | Dong et al. | 106/823 |
| 5,622,556 | A | | 4/1997 | Schulman | 106/677 |
| 5,725,652 | A | | 3/1998 | Schulman | 106/677 |
| 5,736,600 | A | * | 4/1998 | Karkare et al. | 106/822 |
| 5,766,323 | A | * | 6/1998 | Butler et al. | 106/2 |
| 5,795,932 | A | | 8/1998 | Dragner et al. | 524/276 |

FOREIGN PATENT DOCUMENTS

| | | | |
|---|---|---|---|
| DE | 2651772 | 5/1977 | C04B/7/35 |
| DE | 2702984 | 7/1978 | C04B/13/21 |
| DE | 28 20 389 | 11/1978 | C08J/3/01 |
| DE | 3214572 A1 | 10/1983 | C04B/7/35 |
| DE | 3405917 | 9/1984 | C04B/25/02 |
| DE | 3321027 | 12/1984 | C04B/13/24 |
| DE | 4124441 A1 | 1/1993 | C04B/32/02 |
| DE | 195 39 908 A1 | 5/1995 | C04B/24/08 |
| DE | 195 44 018 | 6/1997 | C04B/22/06 |
| EP | 35 9068 B1 | 3/1990 | C04B/28/04 |
| EP | 461 738 A1 | 12/1991 | C04B/24/00 |
| EP | 599 458 B1 | 6/1994 | E04C/2/24 |
| FR | 2574781 A1 | 6/1986 | C04B/28/04 |

* cited by examiner

*Primary Examiner*—Michael Marcheschi
(74) *Attorney, Agent, or Firm*—Duane Morris LLP

(57) ABSTRACT

An additive for, a method of adding thereof to uncured mixes for and resulting cured cement-type concreations such as cured embodiments of concrete, marcadam, and roof-top shingles each exhibiting improved heat and freeze-thaw durability resulting from reduced efflorescence and stability against sun ultraviolet light exposure.

94 Claims, 10 Drawing Sheets

Example 1 - WEATHEROMETER DATA (WD) AT 100 CYCLES

| | WD RATING |
|---|---|
| Control unit unit (cement alone) | 5 (poor) |
| Calcium stearate - containing (alone) unit | 1 (good) |
| 20% cement with plasticizer | 4 (poor/unsatisfactory) |
| Polymer blend + ECA unit | 0 (excellent) |

Example 3 - WEATHEROMETER DATA (WD) AT 100 CYCLES

| | WD RATING |
|---|---|
| Control Unit Unit (Cement Alone) | 5 (poor) |
| Calcium Stearate — containing (alone) unit | 1 (good) |
| 20% cement with plasticizer | 4 (poor, unsatisfactory) |
| Polymer blend + ECA unit | 0 (excellent) |

Example 4 WEATHEROMETER DATA (WD) AT 100 CYCLES

| | WD RATING |
|---|---|
| Control unit unit (cement alone) | 5 (poor) |
| Calcium Stearate -containing (alone) unit | 1 (good) |
| 20% cement with plasticizer | 4 (poor, unsatisfactory) |
| Polymer blend + ECA unit | 0 (excellent) |

Example 5 - WEATHEROMETER DATA (WD) AT 100 CYCLES

| | WD RATING |
|---|---|
| Control Unit Unit (Cement Alone) | 5 (poor) |
| Calcium Stearate — containing (alone) unit | 1 (good) |
| 20% cement with plasticizer | 4 (poor, unsatisfactory) |
| Polymer blend + ECA unit | 0 (excellent) |

Example 6 - WEATHEROMETER DATA (WD) AT 100 CYCLES

| | WD RATING |
|---|---|
| Control Unit Unit (Cement Alone) | 5 (poor) |
| Calcium Stearate – containing (alone) unit | 1 (good) |
| 20% cement with plasticizer | 4 (poor, unsatisfactory) |
| Polymer blend + ECA unit | 0 (excellent) |

Example 7 - WEATHEROMETER DATA (WD) AT 100 CYCLES

| | WD RATING |
|---|---|
| Control Unit Unit (Cement Alone) | 5 (poor) |
| Calcium Stearate — containing (alone) unit | 1 (good) |
| 20% cement with plasticizer | 4 (poor, unsatisfactory) |
| Polymer blend + ECA unit | 0 (excellent) |

ADDITIVE FOR, METHOD OF ADDING THEREOF AND RESULTING CURED CEMENT-TYPE CONCREATIONS FOR IMPROVED HEAT AND FREEZE-THAW DURABILITY

Matter enclosed in heavy brackets [ ] appears in the original patent but forms no part of this reissue specification; matter printed in italics indicates the additions made by reissue.

PRIOR ART

Prior art patents include U.S. Pat. No. 3,645,763 issued Feb. 29, 1972 to Anathony R. Ronzio et. al., U.S. Pat. No. 3,895,953 issued Jul. 22, 1975 to Povindar K. Mehta et al., U.S. Pat. No. 4,268,316 issued May 19, 1981 to Milton H. Wills, Jr., U.S. Pat. No. 4,434,193 issued Feb. 28, 1984 to Thomas Beckenhauer, U.S. Pat. No. 4,983,220 issued Jan. 8, 1991 to Alain Mathieu, U.S. Pat. No. 4,999,218 issued Mar. 12, 1991 to Gerd Rebner, et al., U.S. Pat. No. 5,460,648 issued Oct. 24, 1995 to Craig T. Walloch et al., U.S. Pat. No. 5,494,741 issued Feb. 27, 1996 to Frank Fekete, U.S. Pat. No. 5,531,824 issued Jul. 2, 1996 to J. Pate Burkes et al., U.S. Pat. No. 5,595,594 issued Jul. 21, 1997 to Jier-Yi Dong et al.

BACKGROUND & OBJECTS

In the relevant trade heretofore up to the time of the present invention, it became apparent to those skilled in the art that preexisting cured cements, [marcadam] *macadam* and roof-top shingles prior to the present invention each and all underwent significant destructive deterioration when subjected in normal use thereof to long and/or repeated exposures to the sun and/or to repeated heat and/or freeze-thaw conditions in normal usage. While efforts to improve durability and reduction of efflorescence (powdering resulting from water-loss) have been made in the prior art by the utilization of compositions designated efflorescence control agents (often designated ECA), it is well known that the inclusion of such ECA—typically calcium stearate alone in concrete formulations, often results in "reduced" durability of the resulting the final cured product. Moreover, recent testing completed by the NCMA and Control testing laboratories show that the use of sealers is ineffective in reducing efflorescence and/or improving durability of concrete products. Also heretofore, testing facilities have recommended in the prior art, to "remove" (or omit) ECA (as an ingredient) in concrete formulation(s), in order to "improve" freeze and/or freeze-thaw durability of cured concrete products—even though such omission of ECA results in increased efflorescence. Despite the many prior and conflicting attempts of prior art artisans to attain combined both durability and efflorescence control (suppression) and/or improvement(s) in numerous one(s) of a variety of concrete-type products, lack of satisfactory results and/or remedies heretofore have resulted in necessary continued attempts in the trade, to obtain more effective approaches and resulting concrete-type products in these regards. Additionally, in addition to continuing aforenoted problems, also for prior and present concrete-type concreations, yellowing thereof of cured products thereof have in the past and heretofore have continued to be a plaguing problem prior to the present invention, heretofore resulting in continuing loss(es) of sales thereof as a result of contractors and/or home owners and the like finding such yellowing discoloration aesthetically unattractive and thus undesireable.

Accordingly, an object of this invention include the creation of an additive for, a method of adding thereof and resulting cured cement-type concreations for improved durability against repetitive and/or prolonged heat, freeze-thaw and sunlight-ultraviolet light exposure(s) and yellowing of cured embodiments of typically each of concrete, [marcadam] *madacam*, and roof-top shingles.

More particularly an object of the invention is to achieve an ultimate result of reduced efflorescence during and after curing of cement-type concreations against one or more of repetitive heat and freeze-thaw conditions and prolonged and/or repetitive exposure(s) to sunlight ultraviolet light radiation, as a result of each of novel additive compositions, method(s) of adding and/or creation, and the resulting time-cured aforenoted embodiments thereof.

Another object is to obtain an additive which when utilized in producing a final concrete-like concreation, is not accompanied by subsequent yellowing.

Other objects become apparent from the preceding and following disclosure.

The Ronzio et. al. patent divergently relates to a different and unrelated combination of compounds, namely barium hydroxide or oxide in combination with a high molecular weight polyvinyl alcohol having also high viscosity and low solubility or insolubility in water. The Mehta patent is directed to a totally different and unrelated alleged problem of slump loss allegedly occuring during transport of uncured freshly mixed portland cement concretes allegedly overcome by addition of a single compound—namely styrene-butadiene latices. The Wills, Jr. patent is directed to utilization of a combination/blend of kiln dust and fly ash as a part of masonry cement—having no discernible composition relevant-relationship to the present invention. The Beckenhauer patent is directed to a surface-applied coating for previously applied masonry, utilizing as the coating of an acidic solution of polyethylene glycol—apart from this prior art "acidic" nature inconsistent with the present invention of Applicant, the Beckenhauer patent/invention also otherwise having no discernible bearing on the present invention and in fact inconsistent therewith. The Mathiew patent relates to a method of incorporation of calcium aluminates and trihydrated alumina-based material as a setting accelerater for Portland cement—such having no relevant bearing nor similarity to the present invention. The Rehmer et al. patent likewise is directed as a "surface coating" directly onto previously completed mineral substrate(s) of an aqueous dispersion (and thereafter drying thereof) of a aquous-carrier coating mixture of polyacrylate in combination, as a dispersion therein—the dispersion including each of a disperion of a copolymer of three basic different reactants, together with an aromatic ketone; for such divergent surface-coating patented invention (divergent from and in stark contrast with regard to the present different and divergent invention of Applicant). Likewise, the Walloch et al. patented invention is unrelatedly and divergently directed to a method and resulting composition requiring single additive blend of an "acid" component—namely "tall oil" fatty acid "partially" saphonified with calcium hydroxide, thereafter blended with a calcium stearate dispersion; in an alternate but equally unrelated invention, the Walloch et al. "tall oil" fatty "acid" has introduced thereinto, a preprepared mixture of potassium hydroxide with calcium stearate—bearing no discernible relationship to the present invention of the present applicant. The Fakete patent likewise is divergently directed to a surface-treatment composition, utilizing a copolymer inclusive of an unsaturated polymer inclusive of one or the other of carbon bonded carboxyl groups or carbon-bonded hydroxyl groups, or both, in the molecule, together with a particular catalyst. The Burkes et al patent is likewise directed to a cement post-cured treatment by submersion of the cured cement in a solution of alkali metal hydroxide and aluminum nitrate at a specified temperature for a period of multiple days—totally divergent from and unrelated to the objects and composition of the present invention of the present applicant. The Dong et al patent likewise divergently relates to "tall oil" in the form of a "fatty acid" (optionally with an alkanolamine or alyamine), totally inconsistent with and non-teaching of the present invention of the present applicant.

BROAD INVENTION

The invention is embodied in each of an additive for addition in the making of cementitious compositions, a method of adding thereof to uncured mixes and resulting cured cementitious compositions. Typical of those cured cementitious compositions are cured embodiments of concrete, macadam, and roof-top shingles. Each thereof exhibit improved heat and freeze-thaw durability and reduced yellowing and reduced efflorescence as a result of synergistically reduced efflorescence and synergistically improved stability against sun ultraviolet light exposure and against efflorescence, together with absence of subsequent yellowing of cured cementitious compositions.

Accordingly, a novel additive composition for reduced efflorescence improving durability properties at-least against variable repetitive conditions of one or more of heat and freeze-thaw of cement-type concreations has been created. The components thereof interact synergistically and the relative amounts by weight are each and both critical broadly as well as in more preferred embodiments thereof as set-forth below. The additive composition broadly includes as a combination at least one of both chemically different compounds a) and b) synergistically interactive to obtain the beneficial results described herein. The compound(s) a) includes at least one particulated polymer having particles thereof within a range in size from about 0.01 angstroms to about 10,000 angstroms. The component(s) (compound(s) and/or mixtures) b) critically include(s) at-least one hydrophobic compound. The particulated polymer critically ranges in weight from about 5 percent to about 75 percent by combined weights of the particulated polymer and the hydrophobic component.

In a first preferred embodiment, as an improvement on the aforenoted broadly-defined additive composition, the particulated polymer(s) range(s) in weight from about 25 percent to about 50 percent of the additive composition, and the component b) ranges from about 5 to about 75 percent by weight of the additive composition.

In a second preferred embodiment, as an improvement on the first preferred embodiment, the particles of the particulated polymer(s) range(s) in size within a range of from about 0.5 angstroms to about 1500 angstroms.

In a third preferred embodiment, as an improvement on the second preferred embodiment, the particulated polymer includes at-least a major amount of styrene butadiene relative to total particulated polymer present.

In a fourth preferred embodiment, as an improvement on the second preferred embodiment, the particulated polymer includes at-least a major amount of polyvinyl acetate relative to total particulated polymer present.

In a fifth preferred embodiment, as an improvement on the second preferred embodiment, the particulated polymer includes at-least a major amount of acrylonitrile-butadiene rubber relative to total particulated polymer present.

In a sixth preferred embodiment, as an improvement on the second preferred embodiment, the particulated polymer includes at-least a major amount of polyacrylic ester relative to total particulated polymer present.

In a seventh preferred embodiment, as an improvement on the second preferred embodiment, the particulated polymer includes at-least a major amount of polyvinylvinylidene relative to total particulated polymer present.

In a eighth preferred embodiment, as an improvement on the second preferred embodiment, the particulated polymer includes at-least a major amount of chloride-substituted vinyl chloride relative to total particulated polymer present.

In a ninth preferred embodiment, as an improvement on the second preferred embodiment, the particulated polymer includes at-least a major amount of polyethylene-vinyl acetate relative to total particulated polymer present.

In a tenth preferred embodiment, as an improvement on the second preferred embodiment, the particulated polymer includes at-least a major amount of polyepoxide relative to total particulated polymer present.

In an eleventh preferred embodiment, as an improvement on the second preferred embodiment, the particulated polymer includes at-least a major amount of polyurethane relative to total particulated polymer present.

In a twelfth preferred embodiment, as an improvement on the second preferred embodiment, the particulated polymer includes at-least a major amount of acrylic latex relative to total particulated polymer present.

In a thirteenth preferred embodiment, as an improvement on the second preferred embodiment, the particulated polymer includes at-least a major amount of calcium stearate relative to total particulated polymer present.

In a fourteenth preferred embodiment, as an improvement on the second preferred embodiment, the particulated polymer of the at least one of the a) compound comprises at-least a major amount of a copolymer relative to total particulated polymer present.

In a fifteenth preferred embodiment, as an improvement on the fourteenth preferred embodiment, the particulated copolymer comprises at-least a major amount of styrene butadiene relative to total particulated polymer present.

In a sixteenth preferred embodiment, as an improvement on the fifteenth preferred embodiment, the particulated copolymer comprises at-least a major amount of polyvinyl acetate relative to total particulated polymer present.

In a seventeenth preferred embodiment, as an improvement on the aforenoted broad generic embodiment of the invention, the particulated copolymer comprises at-least a major amount of polyethylene-vinyl acetate relative to total particulated polymer present.

In a eighteenth preferred embodiment, as an improvement on the broad generic embodiment of the invention, the particulated polymer comprises at-least a major amount of styrene butadiene relative to total particulated polymer present.

In a ninteenth preferred embodiment as an improvement on the broad generic embodiment of the invention, the particulated polymer includes at-least a major amount of polyvinyl acetate relative to total particulated polymer present.

In a twentieth preferred embodiment, as an improvement on the broad generic invention, the particulated polymer includes at-least a major amount of acrylonitrile-butadiene rubber relative to total particulated polymer present.

In a twenty-first preferred embodiment, as an improvement on the broad generic invention, the particulated polymer includes at-least a major amount of polyacrylic ester relative to total particulated polymer present.

In a twenty-second preferred embodiment, as an improvement on the broad generic invention, the particulated polymer includes at-least a major amount of polyvinylidene ester relative to total particulated polymer present.

In a twenty-third preferred embodiment, as an improvement on the broad generic invention, the particulated polymer includes at-least a major amount of chloride-substituted vinyl chloride ester relative to total particulated polymer present.

In a twenty-fourth preferred embodiment, as an improvement on the broad generic invention, the particulated polymer includes at-least a major amount of polyethylene-substituted vinyl acetate relative to total particulated polymer present.

In a twenty-fifth preferred embodiment, as an improvement on the broad generic invention, the particulated polymer includes at-least a major amount of polyepoxide relative to total particulated polymer present.

In a twenty-sixth preferred embodiment, as an improvement on the broad generic invention, the particulated polymer includes at-least a major amount of polyurethane relative to total particulated polymer present.

In a twenty-seventh preferred embodiment, as an improvement on the broad generic invention, the particulated polymer includes at-least a major amount of acrylic latex relative to total particulated polymer present.

In a twenty-eighth preferred embodiment, as an improvement on the broad generic invention, the particulated polymer includes at-least a major amount of calcium stearate relative to total particulated polymer present.

In a twenty-ninth preferred embodiment as an improvement on the broad generic invention, there is additionally included stone-like substrate.

In a thirtieth preferred embodiment, as an improvement on the thirtieth preferred embodiment, the stone-like substrate is included as a concrete component comprises sand as a predominate and major portion thereof.

In a thirty-first preferred embodiment, as an improvement on the thirtieth preferred embodiment, there is included—relative to other components of the additive composition as an additive for roof-top shingles, a minor amount of oil in an amount sufficient to impart water-barrier properties and improved durability against repetitious heat and freeze-thaw temperature changes.

In a thirty-second preferred embodiment, as an improvement on the thirtieth preferred embodiment, the stone-like substrate is present in a water-set concrete state in a configuration-form of a concrete pavement.

In a thirty-third preferred embodiment, as an improvement on the thirtieth preferred embodiment the stone-like substrate as a [marcadam] *macadam* component comprises crushed stone of stone sizes substantially larger than sand, as a predominate and major portion thereof.

In a thirty-fourth preferred embodiment, as an improvement on the thirtieth preferred embodiment, there is included a tar-like binder in a minor amount on weight and volume bases as a [marcadam] *macadam* component.

In a thirty-fifth preferred embodiment, as an improvement on the thirtieth preferred embodiment, the tar-like binder is as at least a major proportion thereof a natural-occuring tar.

In a thirty-sixth preferred embodiment, as an improvement on the thirtieth preferred embodiment, the tar-like binder is as at least a major proportion thereof a synthetic tar.

In a thirty-seventh preferred embodiment, as an improvement on the thirtieth preferred embodiment, there is included a tar-like binder and paper layers adhered together as laminate by the tar-like binder, in a configuration-form of a roof-top shingle.

In a thirty-eighth preferred embodiment, as an improvement on the thirty-fourth preferred embodiment, there is included a tar-like binder in a tar-set state in a configuration-form of a [marcadam] *macadam* pavement.

In a thirty-ninth preferred embodiment, as an improvement on the thirty-second preferred embodiment, in which the concrete pavement is in a water-set state in a configuration form of sound-barrier precast panel.

In a fortieth preferred embodiment, as an improvement on the thirty-second preferred embodiment, the ready-mix cement-type concreation is shaped in a water-set concrete state in a configuration of a concrete building block.

In a forty-first preferred embodiment, there is a method of making the additive composition for reduced efflorescence of the broad generic invention. The method broadly includes admixing the aforenoted compound b) with the aforenoted compound a).

In a forty-second preferred embodiment, the additive of aforenoted broad generic invention additionally includes at as the aforenoted compound(s) b) in a blend of at-least each of calcium stearate, zinc stearate, aluminum stearate as at-least the major components of the compounds b).

In a forty-third preferred embodiment as an improvement on the forty-second preferred embodiment, the blend additionally includes in at least effective amounts of each thereof at least one of each of a dispersant, a plasticizer, a lubricant, a salt scavenger, a viscosity modifier.

In a forty-fourth preferred embodiment as an improvement on the forty-third preferred embodiment, as the at least one particulated polymer, there are included in at-least effective amounts of each thereof a polymer blend of styrene butadiene, polyepoxide, and acrylonitrile-butadiene latex-rubber, as to impart improved durability.

In a forty-fifth preferred embodiment as an improvement on the forty-fourth preferred embodiment, the lubricant includes at-least an effective lubricating amount of cocomide diethyl amine.

In a forty-seventh preferred embodiment as an improvement on the forty-fourth preferred embodiment, the dispersant comprises an effective dispersing amount of sodium polyacrylate.

In a forty-eighth preferred embodiment as an improvement on the forty-fourth preferred embodiment, the salt scavenger comprises an effective scavenging amount of barium carbonate.

In a forty-ninth preferred embodiment as an improvement on the forty-fourth preferred embodiment, the viscosity modifier comprises an effective modifying amount of carageenan pre-blended in ethylene glycol.

In a fiftieth preferred embodiment as an improvement on the forty-fifth preferred embodiment, the biological agent comprises an effective amount sufficient to function as a biological control agent.

In a fifty-first preferred embodiment as an improvement on the broad generic aforenoted invention, the particulated polymer comprises polyurethane in an amount sufficient to impart effective improved durability against heat and freeze-thaw deterioration.

In each of a fifty-second and fifty-third and fifty-fourth preferred embodiments as improvements on broad generic aforenoted invention and on the second and forty-fourth preferred embodiments, there are additionally included in effective concrete-forming amounts thereof, concrete components—namely at-least one of each of: 1) stone-like substrate as a concrete component that comprises sand as a predominate and major portion thereof; 2) a dispersant; 3) a plasticizer, 4) a lubricant, 5) a salt scavenger, and 6) a viscosity modifier, in amounts sufficient to form a concrete-type concreation when admixed with cement components.

In a fifty-fifth preferred embodiment, a method of making a cement-type concreations of the generic invention, includes combination steps:

1) first-admixing the compound b) with at-least one of a dispersant, a plasticizer, a lubricant, a salt scavenger, and a viscosity modifier, sufficiently to form a modified formula efflorescence agent-admixture. The first-admixing includes critically maintaining temperature within a range of about 50 degrees Fahrenheit to about 200 degrees Fahrenheit, during admixing sufficiently to form a first admixture;
2) second-admixing at-least the compound a) as a single compound a) or blend of a plurality of compound a) with said first admixture, sufficiently to form a second admixture in the nature of a blend. The second-admixing includes intermittently adding and blending predetermined small increment-amounts of the compound a) to the first admixture sufficiently for the second mixture to contain on a weight basis the compound a) particulated polymer in an amount corresponding to from about 5% to about 95 weight percent of weight of the first admixture, such that a mixture is formed which when admixed and cured with a cement-type concreation exhibits synergistically improved durability to heat and freeze-thawing together with synergistically improved reduction of efflorescence.

In a fifty-sixth preferred embodiment as an improvement on the method of the fifty-fifth preferred embodiment, the temperature is critically maintained within a range of from about 95 degrees Fahrenheit to about 120 degrees Fahrenheit during the aforenoted admixing and blending.

In a fifty-seventh preferred embodiment as an improvement on the method of the fifty-sixth preferred embodiment, the amount of compound a) particulated polymer corresponds to a range from about 50% to about 75% by weight of the first admixture.

In a fifty-eighth preferred embodiment as an improvement on the fifty-fifth preferred embodiment, the amount of compound a) particulated corresponds to from about 50% to about 75% by weight of the first admixture.

In a fifty-ninth preferred embodiment as an improvement on the fifty-sixth preferred embodiment, the at-least one particulated polymer includes a polymer blend of styrene butadiene, polyepoxide, and acrylonitrile-butadiene latex-rubber in amount sufficient for the blend to impart improved durability against heat and freeze-thaw deterioration.

In a sixtieth preferred embodiment as an improvement on the fifty-seventh preferred method embodiment, there is a method in which the at-least one particulated polymer includes a polymer blend of styrene butadiene, polyepoxide, and acrylonitrile-butadiene latex-rubber.

In a sixty-first preferred embodiment as an improvement method on the fifty-seventh preferred embodiment, the aforenoted at-least one particulated polymer thereof includes a polymer blend of styrene butadiene, polyepoxide, and acrylonitrile-butadiene latex-rubber. Each thereof and/or the blend thereof are present in amounts sufficient to impart improved durability against repetitious at-least heat and freeze-thaw conditions.

In a sixty-second preferred embodiment as an improvement on the aforenoted forty-fourth preferred embodiment, there is additionally included particulated stone-like substrate, particulated alumina, lime, iron oxide and magnesia. Each thereof are present in effective minor amounts by weight of the concreation prior to inclusion thereof in stably produced conventional concrete, sufficient to impart improved durability against repetitious at-least heat and freeze-thaw conditions.

In a sixty-third preferred embodiment as an improvement on the aforenoted broad generic invention, there are the following method steps in combination, of making a cement-type concreations.

1) First-admix the compound b) with the compound a) sufficiently to form the additive composition of the aforenoted generic broad composition.
2) Thereafter admix the additive composition with particulated cement in an amount sufficient for the additive composition to be present at between about 2 percent and about 20 percent on a weight percentage basis of the weight of the particulated cement.

A sixty-fourth preferred embodiment is an improvement on the second preferred embodiment, as a method of making a cement-type concreation. This preferred method of making includes the steps in combination of as follow.

1) The compound b) is first-admixed with the compound a) sufficiently to form the additive composition of the aforenoted second preferred embodiment.
2) Thereafter the additive composition thereby formed is admixed with particulated cement. The particulated cement is admixed in an amount sufficient for the additive composition to be present at between about 2 percent and about 20 percent on a weight percentage basis of the weight of the particulated cement. Thereby the composition formed has improved durability against especially repetitious heat and freeze-thaw conditions.

In a sixty-fifth preferred embodiment, as an improvement on the second preferred embodiment, the particulated polymer includes one or more polycarbonate(s) in an amount sufficient to impart durability against especially repetitious heat and freeze-thaw conditions.

In a sixty-sixth preferred embodiments as an improvement on the second preferred embodiment, the particulated polymer includes one or more polyesters in an amount sufficient to impart durability against especially repetitious heat and freeze-thaw conditions.

In a sixty-seventh preferred embodiment, as an improvement on the second preferred embodiment, the particulated polymer includes at-least one polymethylmethacrylate in an amount sufficient to impart durability against especially repetitious heat and freeze-thaw conditions.

In a sixty-eighth preferred embodiments as an improvement on the second preferred embodiments the particulated polymer includes at-least one polyethylidene in an amount sufficient to impart especially durability against repetitious heat and freeze-thaw conditions.

In a sixty-ninth preferred embodiments as an improvement on the second preferred embodiment, the particulated polymer includes at-least one polyethylene in an amount sufficient to impart durability against especially repetitious heat and freeze-thaw conditions.

In a seventieth preferred embodiments as an improvement on the second preferred embodiments the particulated polymer includes at-least one polypropylene in an amount sufficient to impart durability against especially repetitious heat and freeze-thaw conditions.

In a seventy-first preferred embodiment, as an improvement on the second preferred embodiment, the particulated polymer includes at-least one polystyrene in an amount sufficient to impart durability against especially repetitious heat and freeze-thaw conditions.

In a seventy-second preferred embodiment, as an improvement on the second preferred embodiment, the particulated polymer includes at-least one polyurethane in an amount sufficient to impart durability against especially repetitious heat and freeze-thaw conditions.

In a seventy-third preferred embodiment, as an improvement on the second preferred embodiment, the particulated polymer includes at-least polyepoxide in an amount sufficient to impart durability against especially repetitious heat and freeze-thaw conditions.

In a seventy-fourth preferred embodiment, as an improvement on the second preferred embodiment, the particulated polymer includes at least one polyvinylacetate in an amount sufficient to impart especially durability against especially repetitious heat and freeze-thaw conditions.

In a seventy-fifth preferred embodiment, as an improvement on the second preferred embodiments the particulated polymer includes at-least one polyaterephthalate in an amount sufficient to impart durability against especially repetitious heat and freeze-thaw conditions.

In a seventy-sixth preferred embodiment, as an improvement on the broad generic invention, the particulated polymer compound a) is durable at temperatures within a range of from about 75 degrees Fahrenheit to about 400 degrees Fahrenheit.

In a seventy-seventh preferred embodiment, as an improvement on the broad generic invention, the compound a) is alkaline-stable.

In a seventy-eighth preferred embodiment, as an improvement on the broad generic invention, the compound a) is substantially insoluble (i.e. ranging from very low solubility to totally absence of discernible solubility—the term "substantially insoluble" being a conventional inexact relative term—the term "insoluble conventionally not being exact term of precise solubility in media having a pH including and ranging from neutral through acidic media.

In a seventy-ninth preferred embodiment as an improvement on the seventy-fifth preferred embodiment, the compound a) is substantially insoluble in media having a pH including and ranging neutral through acidic media.

In an eightieth preferred embodiment as an improvement on the seventy-seventh preferred embodiment, the compound a) is stable through ultraviolet exposure of at-least 100 cycles of a D65 light source of a weatherometer designated A QUV accelerated panel unit.

In an eighty-first preferred embodiment as an improvement on the broad generic invention, the compound a) is stable through ultraviolet exposure of at-least 100 cycles of a D65 light source of a weatherometer designated A QUV accelerated panel unit.

In an eighty-second preferred embodiment as an improvement on the seventy-eighth preferred embodiment, the particulated polymer ranges in weight from about 25 percent to about 50 percent, and the particles range in size within a range of from about 0.05 angstroms to about 1500 angstroms.

In an eighty-third preferred embodiment as an improvement on preferred embodiment, the compound(s) b) ranges in weight from about 5 percent to about 75 percent by weight of the total additive composition.

In an eighty-fourth preferred embodiment as an improvement on the first preferred embodiment, the compound(s) b) ranges in weight from about 25 percent to about 50 percent by weight of the total additive composition.

In an eighty-fifty preferred embodiment as an improvement on the fifty-third preferred embodiment, the compound (s) b) ranges in weight from about 0.1 percent to about 40 percent by weight of cement in the cement-type creation.

In an eighty-sixth preferred embodiment as an improvement on the fifty-third preferred embodiment, the compound (s) b) ranges in weight from about 5 percent to about 10 percent by weight of cement in the cement-type creation.

THE FIGURES

DETAILED DESCRIPTION OF THE INVENTION

Figures 1, 2:
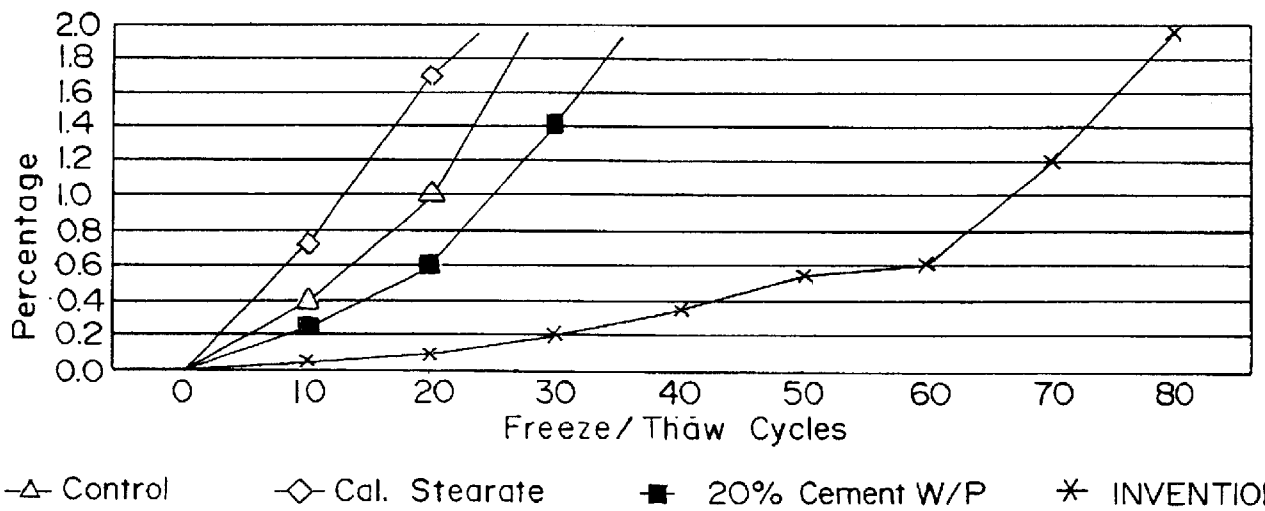
FIG. 1 illustrates a first chart depicting the Weatherometer results of a first evaluation test on the Example 1 product.
FIG. 2 illustrates a second chart depicting the salinity saline-water test results of a second evaluation test on the Example 1 product, re differing freeze-freeze-thaw cycles.

Typically and preferably a vessel is water jacketed for cooling and has dimensions such that the height is about 2.5 times greater than the width or diameter of the rotor stator assembly. The rotor stator employed is preferably a variable-speed, center offset and top-mounted with preferably adjustable height capability. Rotor speed is adjusted as appropriate for adequate mixing together with holding it down sufficiently to prevent vortexing and/or air entrainment. Thereafter typically (but not limited to) about 1% by weight of the prior admixed formulation, are added of each of lubricant (such as typically Cocomide Diethyl amine), dispersant (such as sodium polyacrylate), salt scavenger (such as barium carbonate), and concurrently or thereafter blended for about fifteen minutes (more of less as might be required for reasonable substantially homogeneous admixing thereof). Thereafter a preblended viscosity modifier such as typically Carageenan extract, preblended at about 15% by weight of the total preblend weight, with typically ethylene glycol, is substantially slowly added to the extent required for thorough and complete mixing, to the prior mix, followed by agitation-admixing thereof for typically about ten minutes more or less. Preferably thereafter, there is added any desired or conventional biological control agent in a conventional amount of typically about 0.3 percent by weight of the total prior foregoing admixture, followed by continued or additional admixing for a period of typically about five minutes. Thereafter, the particulated polymer or blend of two or more thereof, is thereupon blended/admixed with the prior aforenoted mix. Typically and preferably there are employed a blend of particulated polymer of styrene butadiene at about 75 percent of the blend weight, about 5 percent of poly epoxy, and about 20 percent of acrylic latex, typically admixed/prepared at normal low speed marine type agitator blending, at a rotor speed drastically reduced (held low) sufficiently to give a blending capacity only to the system. Thereafter sufficient polymer or polymer blend is added (preferably gradually)to the foregoing prepared admixture, such that the finished polymer admixture contains about 35 percent of the aforenoted first-prepared admixture, and about 65 percent more or less, of the added polymer or polymer blend. During addition and following thorough admixture, the admixing period is for about 15 minutes or longer as might be required for substantially homogeneous admixing thereof. At aforenoted percentages, the particulated polymer or blend of polymers is/are present in amounts broadly ranging from about 5 percent to 95 percent, but normally and preferably typically from about 50 percent to about 75 percent, based on the weight of the entire resulting total composition-mix.

This invention is premised on the discovery that efflorescence control agents can be designed with the desired performance characteristics in a particular system, by altering the chemical composition of the ECA with a performance driven polymer blend. This polymer blend allows for improved polymer particle to cement (for example) particle interaction. The polymer and/or blend of a plurality thereof, of the polymers of this invention, may be engineered for application to a plurality of different specific applications. For example, a styrene butadiene component lends both stability and durability against repeated freeze-freeze-thaw and/or elevated temperature exposures. For example, epoxy component provides especially preferred additional strength characteristics to the final cured cement-type concreations. Likewise, acrylic latex provides especially improved stability against ultra violet radiation repeated exposures as well providing enhance non-yellowing durability and/or stability of the cured cement-type concreations.

While not bound to any given theory as to the reasons why nor specific mechanism resulting in the aforenoted improvements and/or advantages of this invention, it has become apparent that more that one instance of synergism exists as previously stated. Additionally however, it has become clear and conclusive that critically the particle size of the particulated polymer(s), together with the aforestated broad and preferred weight ranges, results in the achievement of the objects of the present invention, within the particle broad and more preferred ranges above-stated. Apart therefrom, within the particular polymer(s)-hydrophobic combination (s), there are additionally the aforenoted preferred embodiments each of which obtain further maximized beneficial results characterized by aforenoted objects. Also, through extensive experimentation and testing, it became apparent that the present invention extends over a broad spectrum of cement-type concreations and methods of preparation thereof. For example, apart from aforestated preferred embodiments of cured ultimate products, one thereof is directed to concrete roof tile(s) utilized in warmer or hot climates, where excessive heat exposures is the primary problem—thus requiring the additive blend to be modified slightly to be directed more specifically at that problem—not being faced with heat-freeze-thaw cycles; in such warmer environment(s), there is also typically greater exposure to ultraviolet light and to excessive amounts of rain, each and/or both requiring conventional modifications in the formula to meet the primary problems of that/those climatic and/or geographical area(s).

A plurality of various probative tests were employed by the inventor, in testing for the presence or absence of aforenoted problems with control(s) and various blends of the composition(s) of the present invention.

EXAMPLE 1

This example is directed to a composition and procedure relating to durability of a concrete segmental retaining wall unit.

Figure 3:
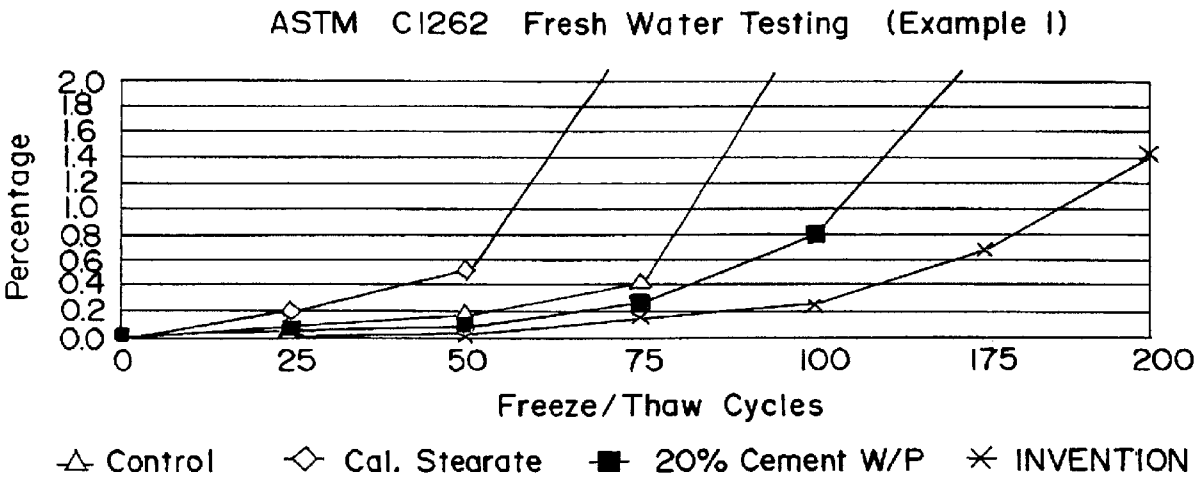
FIG. 3 illustrates a third chart depicting the salinity fresh water results of a second evaluation test on the Example 1 product, re differing freeze-freeze-thaw cycles.

To a laboratory batching kitchen aid mixer, 150 grams, of normal type 1 cement was added. In addition, 1350 grams of stone and sand fitted to any optimized aggregate blend curve for a typical retaining wall with an FM of 3.70 was added. In addition, a red iron oxide pigment was added at 3.0% based on the weight of cement (4.5 grams). The cement, aggregate and pigment were blended for two minutes. Sixty grams of water was added sufficient to attain a water to cement ratio of 0.40. The material was then blended for an additional 90 seconds. At that point, 2.45 grams (25 ounces per hundred weight of cement equivalent) of the efflorescence control agent and polymer blend were added to the mix. The efflorescence control agent(s) (ECA) represents 35% by weight and the polymer blend represents 65% by weight. The ECA was a modified calcium stearate. The polymer blend in this instance is 75% styrene butadiene, 20% ultraviolet (UV) stabilized acrylic latex, and 5% poly-epoxy. The sample was mixed for an additional 90 second and then 375 grams of the mix was placed in a steel paver mold and pressed with a hydraulic press to 2000 psi. This sample procedure is repeated a total of four times. The entire procedure is repeated in a control having no admixture and a sample containing a pure calcium stearate ECA. An additional sample is generated using a 20% cement content and a standard non-ionic detergent plasticizer at 4 fluid ounces per hundred weight of cement equivalent. The samples are cured at 135 degrees Fahrenheit and 95% relative humidity for 16 hours. At 28 days the samples are then subjected to durability testing according to ASTM 1262 in both fresh water and saline. The samples are also subjected to weatherometer testing for accelerated efflorescence formation determination and are rated at 100 cycles. The samples are rated on a scale ranging from zero (0) to 5.0, the "0" being "no efflorescence" and "5" being complete surface coverage with deposits; the data is displayed in the FIG. I. FIG. 2 represents the effects for each of those categories in varying percentages thereof versus # of cycles of freezefreeze-thaw via ASTM C1262 Saline Testing inventive polymer blend/ECA combination exhibiting marked superior excellent freeze/freeze-thaw durability. FIG. 3 illustrates the fresh water testing/ASTM C1262 Fresh Water Testing, and represents the effects for each of those categories in varying percentages thereof versus # of cycles of freeze-freeze-thaw. The inventive polymer blend/ECA combination continued to exhibit marked superior excellent freeze-thaw durability.

EXAMPLE 2

Figure 4:
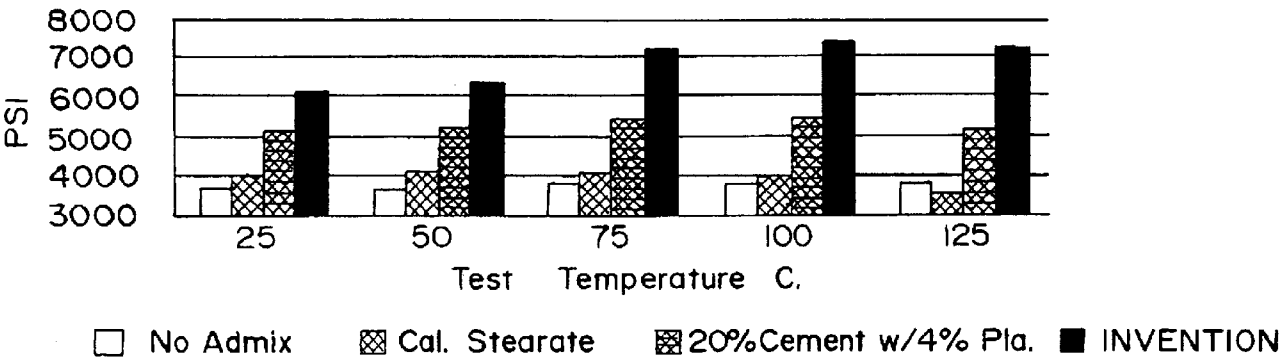
FIG. 4 illustrates a chart depicting compressive strength versus temperature for the Example 2 product.
Figures 5, 6:
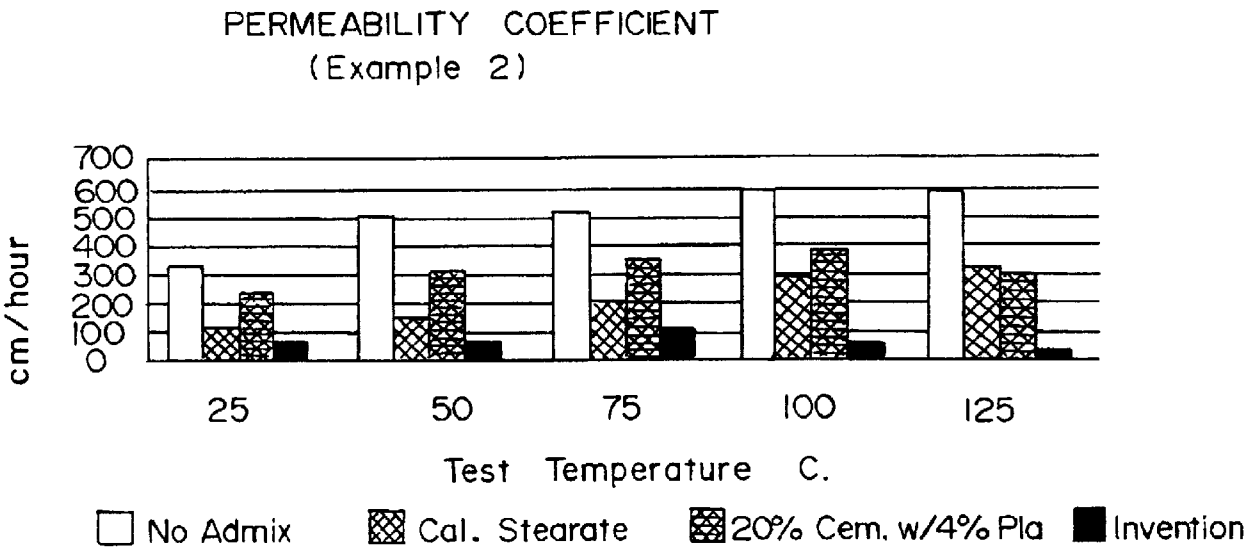
FIG. 5 illustrates a chart depicting permeability coefficient for the Example 2 product.
FIG. 6 illustrates a chart depicting the Weatherometer results of an evaluation test on the Example 3 product.

For the same categories as aforenoted example, comparing compressive strength (as psi) versus different temperatures in a series of different comparisons, FIG. 4 likewise exhibits marked superior performances as regards compressive strength for each comparison. FIG. 5 likewise exhibits marked superior performance in permeability, as regards centimeter(s) (cm) per hour for each comparison.

EXAMPLE 3

Figure 7:
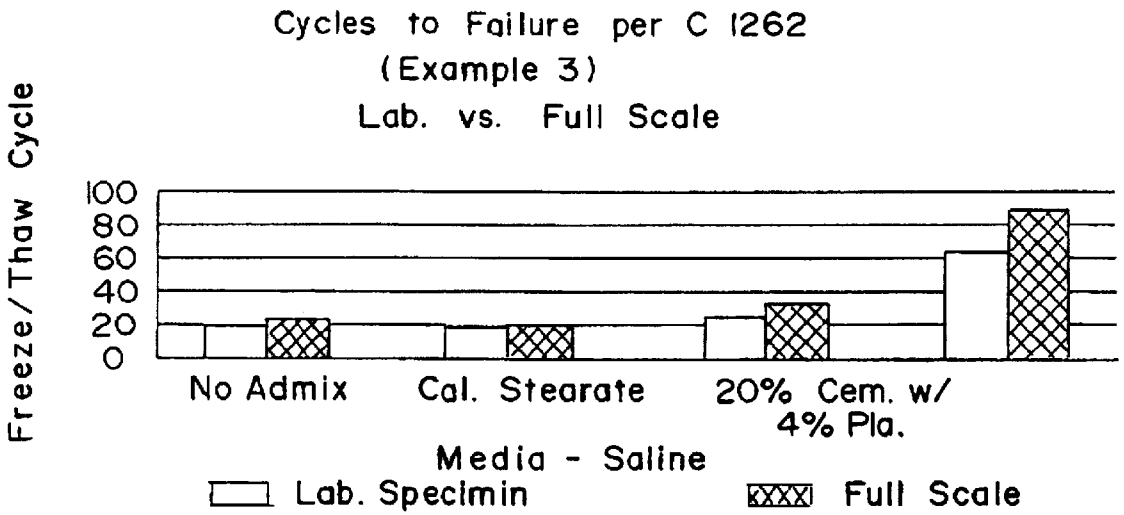
FIG. 7 illustrates a chart depicting cycles to failure per C 1263 for Example 3, for a full scale versus lab scale, in saline media for differing freeze-thaw cycles.
Figure 8:
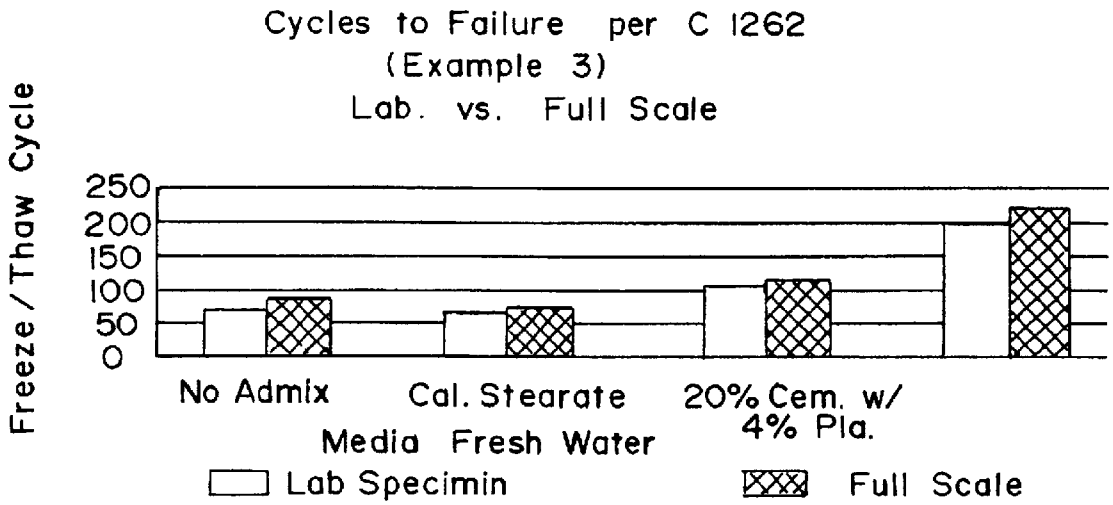
FIG. 8 illustrates a chart depicting cycles to failure per C 1263 for Example 3 for a full scale versus lab scale, in fresh water media for differing freeze-thaw cycles.

For the same categories as aforenoted Example 1, but here on a full scale basis for a production series of units manufactured in an Allen Block Segmental Retaining Wall style, the illustrated results of FIGS. 6, 7 and 8 confirm tests comparable to Example 1 and FIGS. 1 through 3, confirming marked superiority in all categories.

EXAMPLE 4

Figures 9, 10:
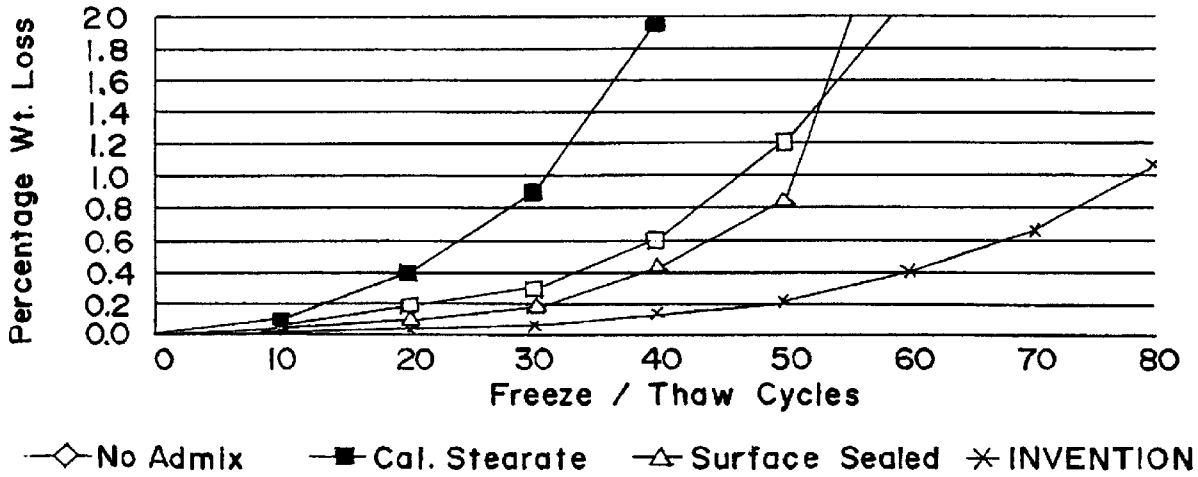
FIG. 9 illustrates the Weatherometer results of a first evaluation test on the Example 4 product.
FIG. 10 illustrates a chart depicting ASTM C1262 data for saline media for Example 4, re freeze-thaw cycles.
Figures 11, 12:
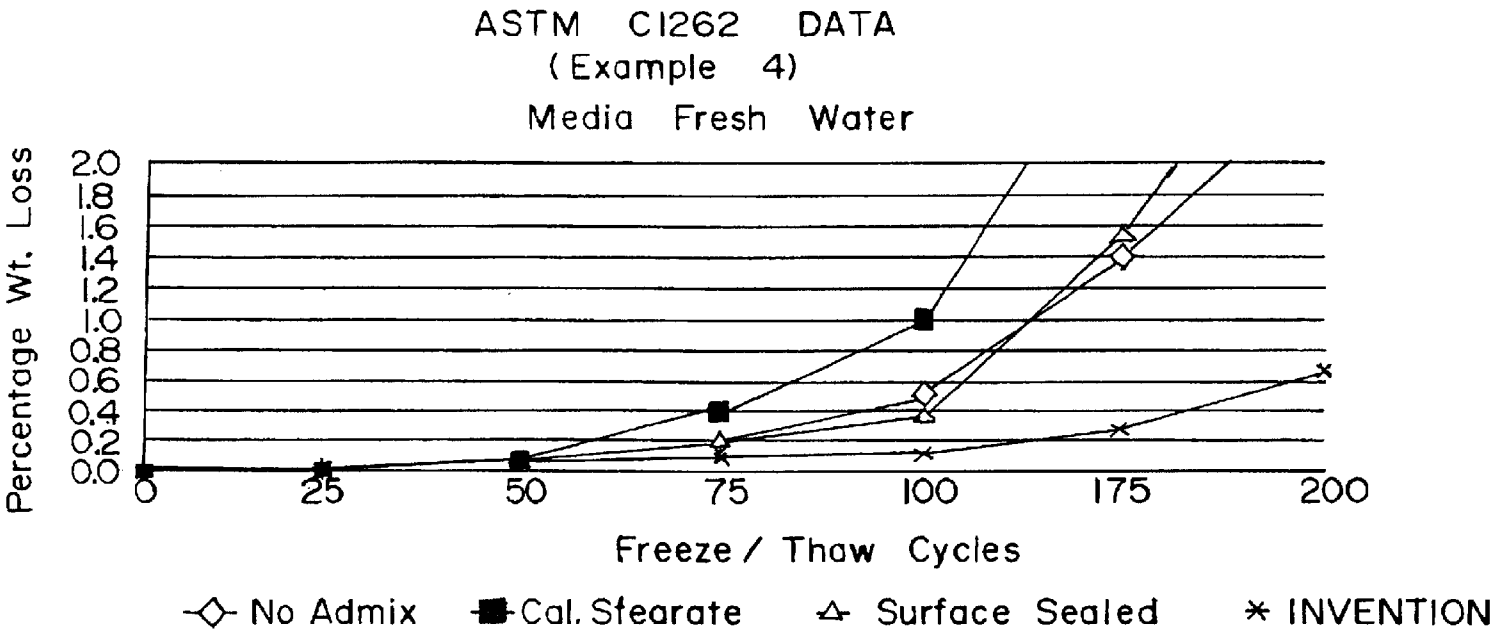
FIG. 11 illustrates a chart also for the Example 4, the same as that of FIG. 10, except here for fresh water.
FIG. 12 illustrates the Weatherometer results of a first evaluation test on the Example 5 product.

For the same categories as aforenoted Example 1 (and foregoing FIGS. 1 through 3), identical tests of Example 4 as illustrated in FIGS. 9 through 11 comparing permeability coefficient (cm/psi) versus different temperatures in a series of different comparisons, FIG. IV for concrete pavingstone likewise exhibits marked superior performance of the additive and concrete pavingstone embodiment.

EXAMPLE 5

Figure 13:
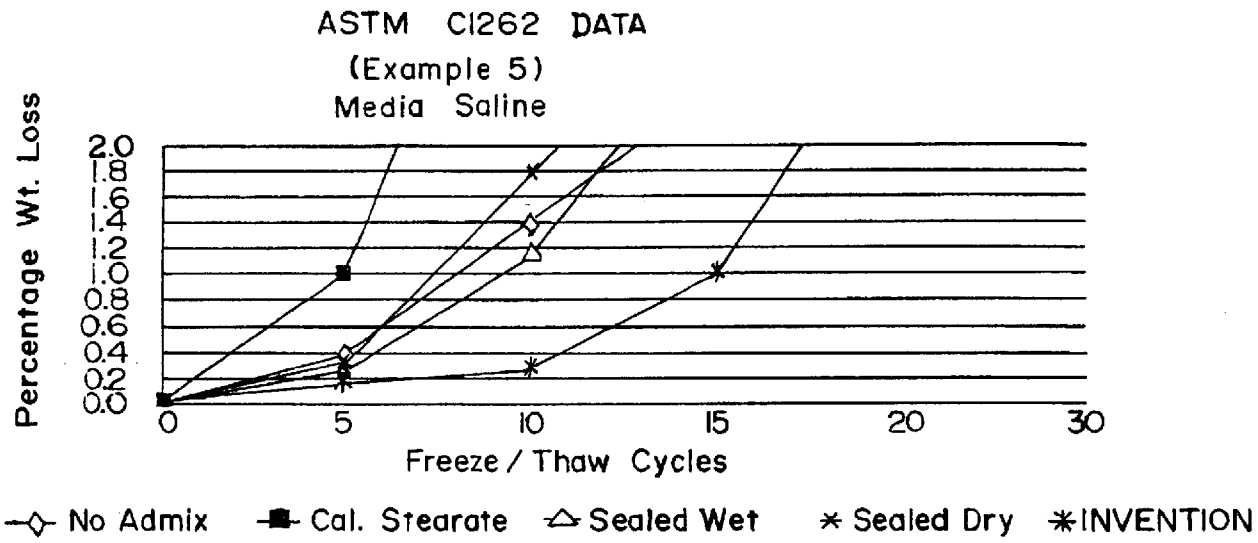
FIG. 13 illustrates a chart depicting ASTM C1262 data for saline media for Example 5, re freeze-thaw cycles.
Figure 14:
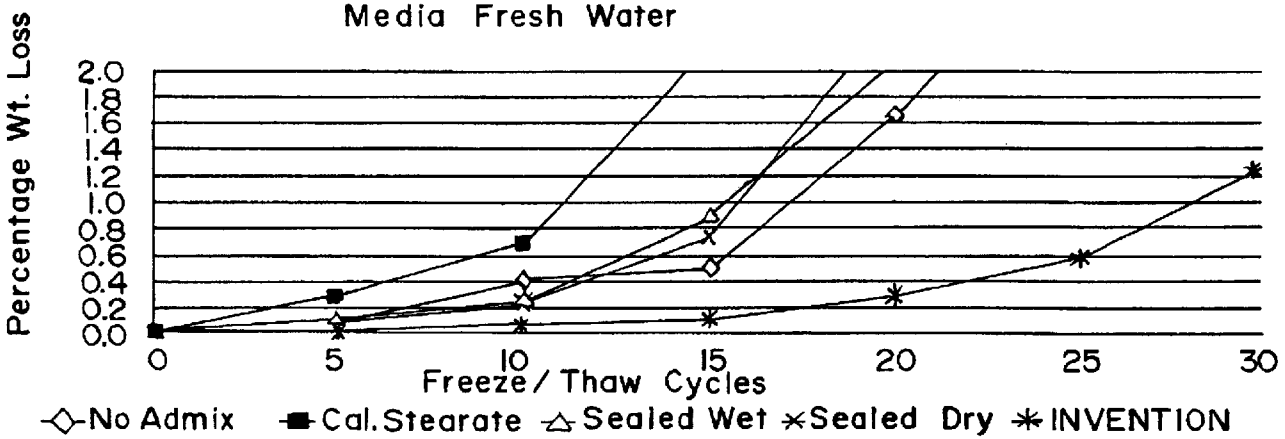
FIG. 14 illustrates a chart depicting ASTM C1262 data for fresh water for the Example 5 product, re freeze-thaw cycles.

For the embodiment of concrete rooftile utilizing 1125 grams of solely sand as aggregate, utilizing (3% by weight of cement) 11.25 grams, and differing from Example 1, adding 150 grams of water, after mixing, followed by adding 150 grams of water (water-cement ratio of 0.40). The thereafter 2.50 grams of ECA added represents 35% by weight and 65% by weight of the polymer-ECA mix thereof. After the sample thereafter was mixed for an additional 90 seconds, 375 grams of the mix is placed in a steel block mold and pressed with a hydraulic press to 1000 psi. This sample procedure was repeated a total of 4 times. The entire procedure was repeated in a control having no admixture and likewise there was prepared a sample containing a pure calcium stearate ECA. An additional sample was generated using no integral admixture but applying a surface acrylic latex surface sealer to both a wet and fully cured series of samples. Otherwise, this procedure was the same as that of Example 1. For the same categories as aforenoted examples, as illustrated here in FIGS. 12 through 14, the inventive combination likewise again exhibits marked superior performance in all categories.

EXAMPLE 6

Figures 15, 16:
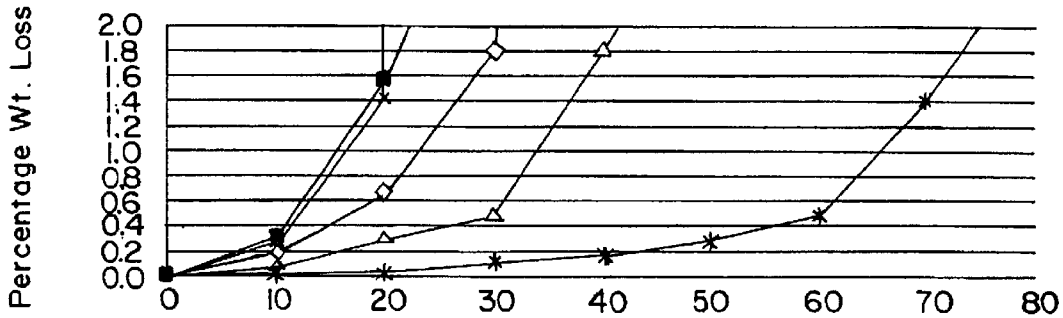
FIG. 15 illustrates the Weatherometer results of a first evaluation test on the Example 6 product.
FIG. 16 illustrates a chart depicting ASTM C1262 data for the Example 6 product in saline water, re freeze-thaw cycles.

For the same categories as aforenoted examples, Example 6 for an embodiment of concrete masonry unit, utilizing the same stone and sand aggregate as Example 1, the procedure and amounts were the same as for preceding Example 1. Utilizing the same tests as for Example 1, the results reflected in corresponding FIGS. 15 through 17 likewise exhibits marked superior performance for the present invention in all categories.

EXAMPLE 7

Figures 17, 18:
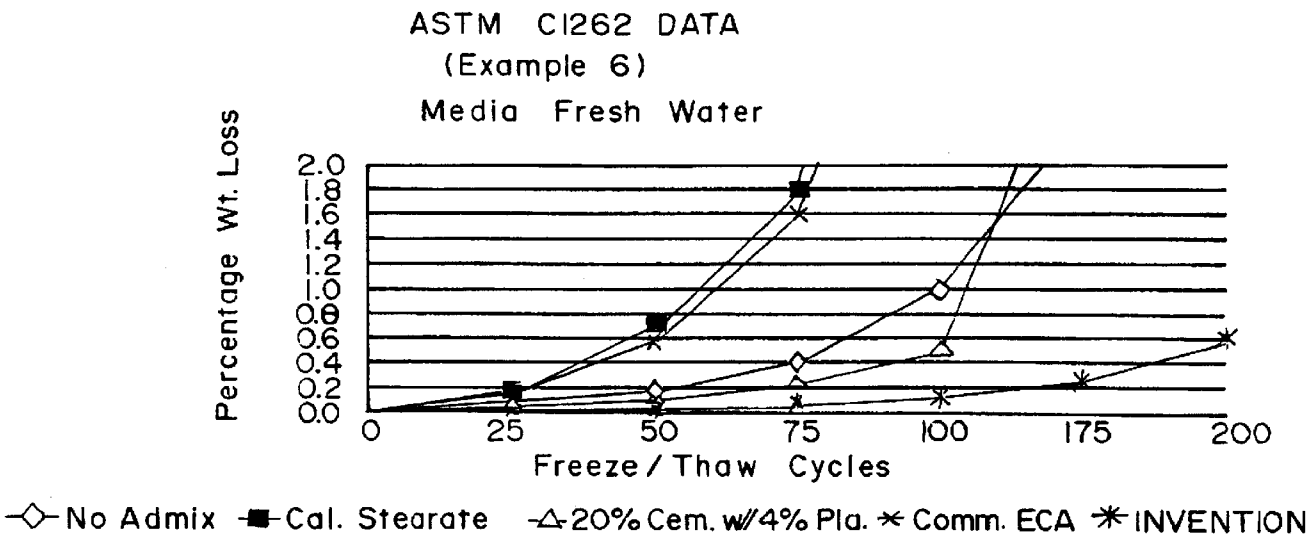
FIG. 17 illustrates a chart depicting ASTM C1262 data for fresh water for the Example 6 product, re freeze-thaw cycles.
FIG. 18 illustrates the Weatherometer results of a first evaluation test on the Example 7 product.
Figure 19:
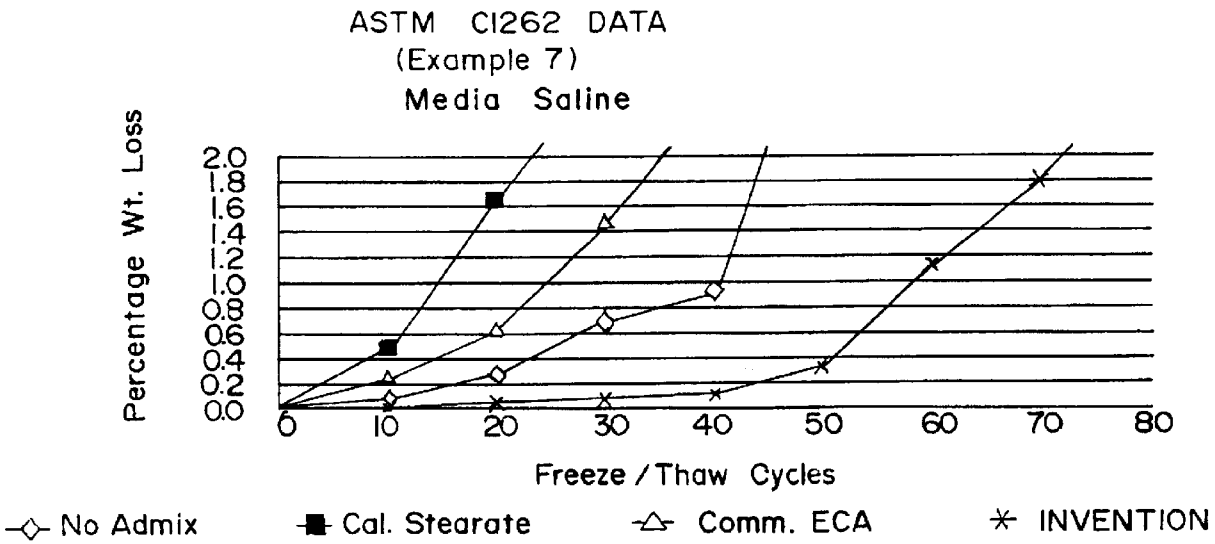
FIG. 19 illustrates a chart depicting ASTM C1262 data for the Example 7 product in saline water, re freeze-thaw cycles.
Figure 20:
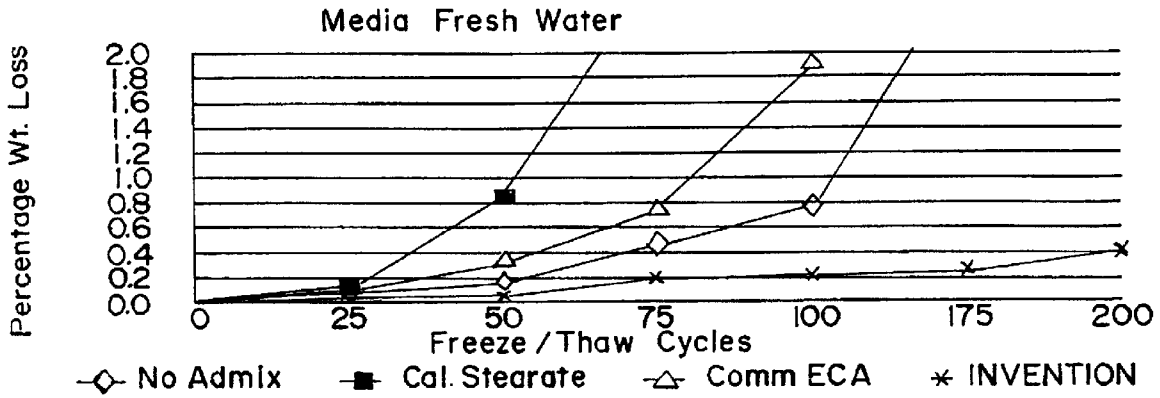
FIG. 20 illustrates a chart depicting ASTM C1262 data for fresh water for the Example 7 product, re freeze-thaw cycles.

For the same categories as aforenoted examples, in testing a ready mix concrete or pressed concrete material, the cement added was the normal type 1, and the iron oxide pigment added was black iron oxide still at 3.0% based on the weight of cement; and after the blending thereof, water was added at 100 grams of water, at the same water-to-cement ratio of 0.40. The thereafter added efflorescence control agent (ECA) was 2.50 grams (25 ounces per hundred weight of cement) was employed—representing 35% by weight and the polymer blend represents 65%. The polymer blend included 60% styrene butadiene, 25 UV stabilized acrylic latex, and 15% polyepoxy. The sample was mixed for an additional 90 seconds and then 375 grams of the mix was placed into a steel mold and given a quick trowel finish. This procedure was repeated a total of four times. The entire procedure was repeated in a control having no admixture, and thereafter again in an additional sample containing a pure calcium stearate ECA. An additional sample was generated using a momomericially available calcium stearate based water resistance admixture. The samples were cured at room temperature and humidity overnight. At 28 days the samples were then subjected to testing as in Example 1. Otherwise, the procedure hereinabove corresponded to (the same as that of) Example 1. The tests as illustrated in FIGS. 18 through 20, for all categories tested, likewise exhibited marked superior performance for the present invention, as regards centimeter(s) (cm) per hour for each comparison.

I claim:

1. An anti efflorescence cementitious additive comprising in combination chemically different compounds "a)" and "b)", compound "a)" including at least one particulated polymer having particles sizes of about 0.01 angstroms to about 10,000 angstroms, and compound "b)" including at-least one hydrophobic compound, *said particulated polymer ranging in weight from about 5 percent to about 75 percent by combined weights of the particulated polymer and the hydrophobic component*.

2. The additive of claim 1, wherein said particulated polymer ranges in weight from about 25 percent to about 50 percent of combined compounds "a)" and "b)".

3. The additive of claim 2, wherein said particulated polymer comprises polyepoxide in a major amount, and in which said particles range in size from about 0.05 angstroms to about 1500 angstroms.

4. The additive of claim 2, in which said particulated polymer comprises styrene butadiene.

5. The additive of claim 2, in which said particulated polymer comprises polyvinylacetate.

6. The additive of claim 2, in which said particulated polymer comprises acrylonitrile-butadiene rubber.

7. The additive of claim 2, in which said particulated polymer comprises polyacrylic ester.

8. The additive of claim 2, in which said particulated polymer comprises polyvinylidene.

9. The additive of claim 2, in which said particulated polymer comprises chloride-vinyl chloride.

10. The additive of claim 2, in which said particulated polymer comprises polyethylene-vinyl acetate.

11. The additive of claim 2, in which said particulated polymer comprises polyepoxide.

12. The additive of claim 2, in which said particulated polymer comprises polyurethane.

13. The additive of claim 2, in which said particulated polymer comprises acrylic latex.

14. The additive of claim 2, in which said particulated polymer comprises calcium stearate.

15. The additive of claim 2, in which said particulated polymer comprises additionally a copolymer.

16. The additive of claim 15, in which said particulated polymer additionally comprises polyvinyl acetate.

17. The additive of claim 15, in which said particulated polymer additionally comprises polyethylene-vinyl acetate.

18. The additive of claim 1, in which said particulated polymer comprises styrene butadiene.

19. The additive of claim 1, in which said particulated polymer comprises polyvinyl acetate.

20. The additive of claim 1, in which said particulated polymer comprises acrylonitrile-butadiene rubber.

21. The additive of claim 1, in which said particulated polymer comprises polyacrylic ester.

22. The additive of claim 1, in which said particulated polymer comprises polyvinylidene.

23. The additive of claim 1, in which said particulated polymer comprises chloride-vinyl chloride.

24. The additive of claim 1, in which said particulated polymer comprises polyethylene-vinyl acetate.

25. The additive of claim 1, in which said particulated polymer comprises polyepoxide.

26. The additive of claim 1, in which said particulated polymer comprises polyurethane.

27. The additive of claim 1, in which said particulated polymer comprises acrylic latex.

28. The additive of claim 1, in which said particulated polymer comprises calcium stearate.

29. The additive of claim 1, further comprising a stone substrate.

30. The additive of claim 29, in which said stone substrate comprises sand as a predominate and major portion thereof.

31. The additive of claim 30, further comprising oil in an amount sufficient to impart water-barrier properties and improved durability against repetitious heat and thaw temperature changes.

32. The additive of claim 29, in which said stone substrate comprises concrete pavement.

33. The additive of claim 29, in which said stone substrate component comprises crushed stone of sizes substantially larger than sand, as a predominate and major portion thereof.

34. The additive of claim 33, further comprising a tar binder.

35. The additive of claim 34, in which said tar binder comprises at least a major proportion of a naturally-occuring tar.

36. The additive of claim 34, in which said tar binder comprises at least a major proportion of a synthetic tar.

37. An article comprising the additive of claim 29, and paper layers adhered together by *a* tar binder.

38. A ready-mix anti-efflorescence composition comprising the additive of claim 34 and [marcadam] *macadam* in a tar-set state.

39. A ready-mix anti-efflorescence composition comprising the additive of claim 34 and a cementitious ingredient in a water-set state.

40. A ready-mix anti-efflorescence composition comprising the additive of claim 30 and a cementitious ingredient in a water-set state.

41. A method of making the additive of claim 1, comprising admixing said compound b) with said compound a).

42. The additive of claim 1, in which said compound b) comprises a blend of calcium stearate, zinc stearate, and aluminum stearate.

43. The additive of claim 42, wherein said blend further comprises at least one of a dispersant, a plasticizer, a lubricant, a salt scavenger, or a viscosity modifier.

44. The additive of claim 1, in which said at least one particulated polymer comprises a polymer blend of styrene butadiene, polyepoxide, and acrylonitrile-butadiene latex-rubber and is present in an amount sufficient to impart improved durability.

45. The additive of claim 43, in which said lubricant comprises an effective lubricating amount of cocomide diethyl amine.

46. The additive of claim 43, in which said plasticizer comprises an effective plasticizing amount of lignon sulfonate.

47. The additive of claim 43, in which said dispersant comprises an effective dispersing amount of sodium polyacrylate.

48. The additive of claim 43, in which said salt [scavanger] *scavenger* comprises an effective salt-scavenging amount of barium carbonate.

49. The additive of claim 43, in which said viscosity modifier comprises an effective viscosity-modifying amount of carageenan pre-blended in ethylene glycol.

50. The additive of claim 44, further comprising *an effective amount of* a biological-control agent.

51. An anti-efflorescence cementitious composition comprising a cementitious material and the additive of claim 1, in which said particulated polymer comprises polyurethane and is present in an effective amount sufficient to impart improved durability against degradation.

52. The additive of claim 1, additionally including: 1) a stone substrate comprising sand as a predominate and major portion thereof; 2) a dispersant; 3) a plasticizer, 4) a lubricant, 5) a salt scavenger, and 6) a viscosity modifier.

53. The additive of claim 3, additionally including: 1) a stone substrate comprising sand as a predominate and major portion thereof; 2) a dispersant; 3) a plasticizer, 4) a lubricant, 5) a salt scavenger, and 6) a viscosity modifier.

54. The additive of claim 44, additionally including: 1) a stone substrate comprising sand as a predominate and major portion thereof; 2) a dispersant; 3) a plasticizer, 4) a lubricant, 5) a salt scavenger, and 6) a viscosity modifier.

55. A method of making the additive of claim 43, comprising in combination, the steps of:

1) first-admixing compound b), a lubricant, a salt scavenger, and a viscosity modifier, the first-admixing including critically maintaining temperature of the admixture within a range of from about 50 degrees Fahrenheit to about 200 degrees Fahrenheit, to form a first admixture; and 2) second-admixing compound a) with said first admixture, to form a second admixture, said second-admixing including intermittently adding and blending small increment-amounts of said compound a) to said first admixture, wherein the additive contains compound a) in an amount of about 5 to about 95 weight percent of said first admixture.

56. The method of claim 55, in which said temperature is maintained within a range of from about 95 degrees Fahrenheit to about 120 degrees Fahrenheit *during admixing and blending*.

57. The method of claim 56, in which said amount of component a) ranges from about 50% to about 75% by weight of said first admixture.

58. The method of claim 55, in which said amount of component a) ranges from about 50% to about 75% by weight of said first admixture.

59. The method of claim 56, in which said compound a) comprises a polymer blend of styrene butadiene, polyepoxide, and acrylonitrile-butadiene latex-rubber and is present in amounts sufficient for the blend to [imart] *impart* improved durability against heat and thaw deterioration.

60. The method of claim 57, in which said compound a) comprises a polymer blend of styrene butadiene, polyepoxide, and acrylonitrile-butadiene latex-rubber, each polymer of the blend being present in amounts sufficient for the polymer blend to impart improved durability against heat and thaw deterioration.

61. The method of claim 57, in which said compound a) comprises a polymer blend of styrene butadiene, polyepoxide, and acrylonitrile-butadiene latex-rubber, and is present in an amount sufficient for the polymer blend to impart improved durability against repetitious heat and thaw conditions.

62. An anti-efflorescence composition comprising (1) the additive of claim 1, (2) a particulated stone substrate, and (3) at-least one of particulated alumina, lime, iron oxide or magnesia.

63. A method of making a cementitious composition, comprising in combination, the steps of sufficiently admixing the additive of claim 1 with a particulated cement in an amount sufficient for the additive composition to be present in an amount between about 2 percent and about 20 percent on a weight percentage basis.

64. A method of making a cement composition comprising in combination, the steps of sufficiently admixing the additive of claim 3 with a particulated cement in an amount sufficient for the additive composition to be present in an amount between about 2 percent and about 20 percent on a weight percentage basis.

65. The anti-efflorescence additive of claim 2, in which said particulated polymer comprises polycarbonate.

66. The anti-efflorescence additive of claim 2, in which said particulated polymer comprises polyester.

67. The anti-efflorescence additive of claim 2, in which said particulated polymer comprises polymethylmethacrylate.

68. The anti-efflorescence additive of claim 2, in which said particulated polymer comprises polyoxyethylidene.

69. The anti-efflorescence additive of claim 2, in which said particulated polymer comprises polyethylene.

70. The anti-efflorescence additive of claim 2, in which said particulated polymer comprises polypropylene.

71. The anti-efflorescence additive of claim 2, in which said particulated polymer comprises polystyrene.

72. The anti-efflorescence additive of claim 2, in which said particulated polymer comprises polyurethane.

73. The anti-efflorescence additive of claim 2, in which said particulated polymer comprises polyepoxide.

74. The anti-efflorescence additive of claim 2, in which said particulated polymer comprises polyvinylacetate.

75. The anti-efflorescence additive of claim 1, in which said compound a) is durable at temperatures within a range of from about 75 degrees Fahrenheit to about 800 degrees Fahrenheit.

76. The anti-efflorescence additive of claim 74, in which said compound a) is alkaline-stable.

77. The anti-efflorescence additive of claim 1, in which said compound a) is insoluble in a media having a pH including and ranging from neutral through acidic.

78. The additive of claim 2, in which said particulated polymer comprises polyterephthalate.

79. The anti-efflorescence additive of claim 78, in which said compound a) is insoluble in media having a pH including and ranging from neutral through acidic.

80. The anti-efflorescence additive of claim 76, in which said compound a) is substantially stable against [degredation] *degradation* when exposed to ultraviolet exposure ranging upwardly through at-least 100 cycles of a D65 light source of a weatherometer.

81. The anti-efflorescence additive of claim 1, in which said compound a) is substantially stable against [degredation] *degradation* when exposed to ultraviolet exposure ranging upwardly through at-least 100 cycles of a D65 light source of a weatherometer.

82. The anti-efflorescence additive of claim [79] *77*, in which said particulated polymer ranges in weight from about 25 percent to about 50 percent, and in which said particles range in size within a range of from about 0.05 angstroms to about 1500 angstroms.

83. The anti-efflorescence additive of claim [79] *77*, in which said compound(s) b) range(s) in weight from about 5 percent to about 75 percent by weight of total anti-efflorescence additive.

84. The anti-efflorescence additive of claim [79] *77*, wherein said compound(s) b) is present in an amount ranging in weight from about 25 percent to about 50 percent by weight of total anti-efflorescence additive.

85. The additive of claim 53, in which said compound(s) b) range(s) in weight from about 1 percent to about 40 percent by weight of total additive.

86. The additive of claim 53, in which said compound(s) b) range(s) in weight from about 5 percent to about 10 percent by weight of total additive.

87. A cementitious additive composition for reducing efflorescence and improving durability of cementitious composition comprising (a) about 5 to about 75 weight percent of at least one particulate polymer compound selected from the group consisting of polyepoxide, styrene butadiene, polyvinyl acetate, acrylonitrile-butadiene latex rubber, polyacrylic ester, polyvinylidene chloride-vinyl chloride, polyethylene-vinyl acetate, [acrylic latex,.] calcium stearate, ethylene-vinyl acetate, polyacrylic ester, polyurethane, and acrylic latex, and (b) at least one hydrophobic compound, wherein the particulated polymer has a size ranging from about 0.01 angstroms to about 10,000 angstroms.

88. The additive of claim 87, wherein the polymer comprises polyepoxide having a size of about 0.05 angstroms to about 1500 angstroms.

89. The additive of claim 87, further comprising sand.

90. The additive of claim 1, further comprising oil in an amount sufficient to impart water-barrier properties to the additive.

91. A method of making the additive composition of claim 87, comprising admixing compound a) and compound b).

92. The additive according to claim 87, wherein the hydrophobic compound comprises a blend of calcium stearate, zinc stearate and aluminum stearate.

93. The additive according to claim 92, wherein the hydrophobic blend further comprises at least one of a dispersant, a plasticizer, a lubricant, a salt scavenger and a viscosity modifier.

94. A cementitious composition comprising cement and the additive according to claim 87, and further comprising sand, a dispersant, a plasticizer, a lubricant, a salt scavenger and a viscosity modifier.

* * * * *